(12) United States Patent
Liu et al.

(10) Patent No.: US 10,863,760 B2
(45) Date of Patent: Dec. 15, 2020

(54) POPCORN POPPER AND MIXING DEVICE

(71) Applicant: Greenfield World Trade, Inc., Fort Lauderdale, FL (US)

(72) Inventors: Rong Liu, Fort Lauderdale, FL (US); Alyssa Issler, Fort Lauderdale, FL (US)

(73) Assignee: GREENFIELD WORLD TRADE, INC, Fort Lauderdale, FL (US)

( * ) Notice: Subject to any disclaimer, the term of this patent is extended or adjusted under 35 U.S.C. 154(b) by 315 days.

(21) Appl. No.: 15/922,293

(22) Filed: Mar. 15, 2018

(65) Prior Publication Data
US 2018/0263267 A1    Sep. 20, 2018

Related U.S. Application Data

(60) Provisional application No. 62/472,613, filed on Mar. 17, 2017.

(51) Int. Cl.
*A23L 7/187* (2016.01)
*A23L 7/191* (2016.01)

(52) U.S. Cl.
CPC ............... *A23L 7/187* (2016.08); *A23L 7/191* (2016.08)

(58) Field of Classification Search
CPC .......... A23L 7/161; A23L 7/183; A23L 7/187; A23L 7/191
USPC ....... 99/323.5, 323.8, 323.9, 323.11; D7/325
See application file for complete search history.

(56) References Cited

U.S. PATENT DOCUMENTS

| | | | | |
|---|---|---|---|---|
| 4,178,843 | A * | 12/1979 | Crabtree | A23L 7/187 426/445 |
| 4,512,247 | A * | 4/1985 | Friedman | A23G 3/26 118/19 |
| 6,000,318 | A * | 12/1999 | Weiss | G07F 17/0078 99/323.5 |

* cited by examiner

*Primary Examiner* — Christopher M Koehler
(74) *Attorney, Agent, or Firm* — Michael E. Dockins; Shumaker, Loop, Kendrick, LLP

(57) ABSTRACT

A popping and mixing device includes a popping chamber for receiving popcorn kernels and converting the same into popped popcorn kernels. A mixing container receives the popped popcorn kernels from the popping chamber. A mixing motor in mechanical communication with the mixing container configured for rotating the popcorn mixing container.

20 Claims, 5 Drawing Sheets

POPCORN POPPER AND MIXING DEVICE

CROSS-REFERENCE TO RELATED APPLICATIONS

This patent application claims the benefit of U.S. Provisional Patent Application Ser. No. 62/472,613, filed on Mar. 17, 2017. The entire disclosure of the above patent applications is hereby incorporated herein by reference.

FIELD OF THE INVENTION

The invention relates to popcorn poppers and, more particularly, to popcorn poppers with an accompanying mixing device.

BACKGROUND OF THE INVENTION

Popcorn poppers that pop a piece of corn kernel to popcorn are known in the art. Popcorn poppers may involve heated air, oil, or other mechanism for causing the expansion of the kernel into a piece of popcorn. Once made, the popcorn is typically transferred to a bowl or other storage device so that salt, butter, or other flavoring or seasoning may be added thereto. This can lead to uneven or otherwise undesirable mixing or coverage of the popcorn with the flavoring or seasoning.

Accordingly, a device for making and mixing popcorn with a flavoring would be desirable.

SUMMARY OF THE INVENTION

In accordance and attuned with the present invention, a device for making and mixing popcorn with a flavoring has surprisingly been discovered.

According to an embodiment of the disclosure, a popping and mixing device is disclosed. The popping and mixing device includes a popping chamber for receiving popcorn kernels and converting the same into popped popcorn kernels. A mixing container receives the popped popcorn kernels from the popping chamber. A mixing motor in mechanical communication with the mixing container configured for rotating the popcorn mixing container.

According to another embodiment of the disclosure, a popping and mixing device is disclosed. The popping and mixing device includes a housing and a popping chamber for receiving popcorn kernels and converting the same into popped popcorn kernels. The popping chamber is disposed in the housing. A popper top cover is rotatable with respect to the housing between a first dispensing position and a second dispensing position. The popper top cover is in fluid communication with the popping chamber. A motor and heater assembly is in heat transfer communication with the popping chamber.

According to yet another embodiment of the disclosure, a popping and mixing device is disclosed. The popping and mixing device includes a housing and a popping chamber for receiving popcorn kernels and converting the same into popped popcorn kernels. The popping chamber is disposed within the housing. A mixing container receives the popped popcorn kernels from the popping chamber. The mixing container is rotatably coupled to the housing. A mixing motor is in mechanical communication with the mixing container configured for rotating the popcorn mixing container.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of any methods disclosed, the steps presented are exemplary in nature, and thus, the order of the steps is not necessary or critical. The terms "upper," "lower," "top," "bottom," "front," "rear," and derivatives thereof relate to FIGS. 1-4 and the orientation of objects described therein and with respect to the direction of gravity. As used herein, substantially is defined at "to a considerable degree," mostly but not necessarily perfectly," or "proximate" or as otherwise understood by one ordinarily skilled in the art.

Figure 1A:
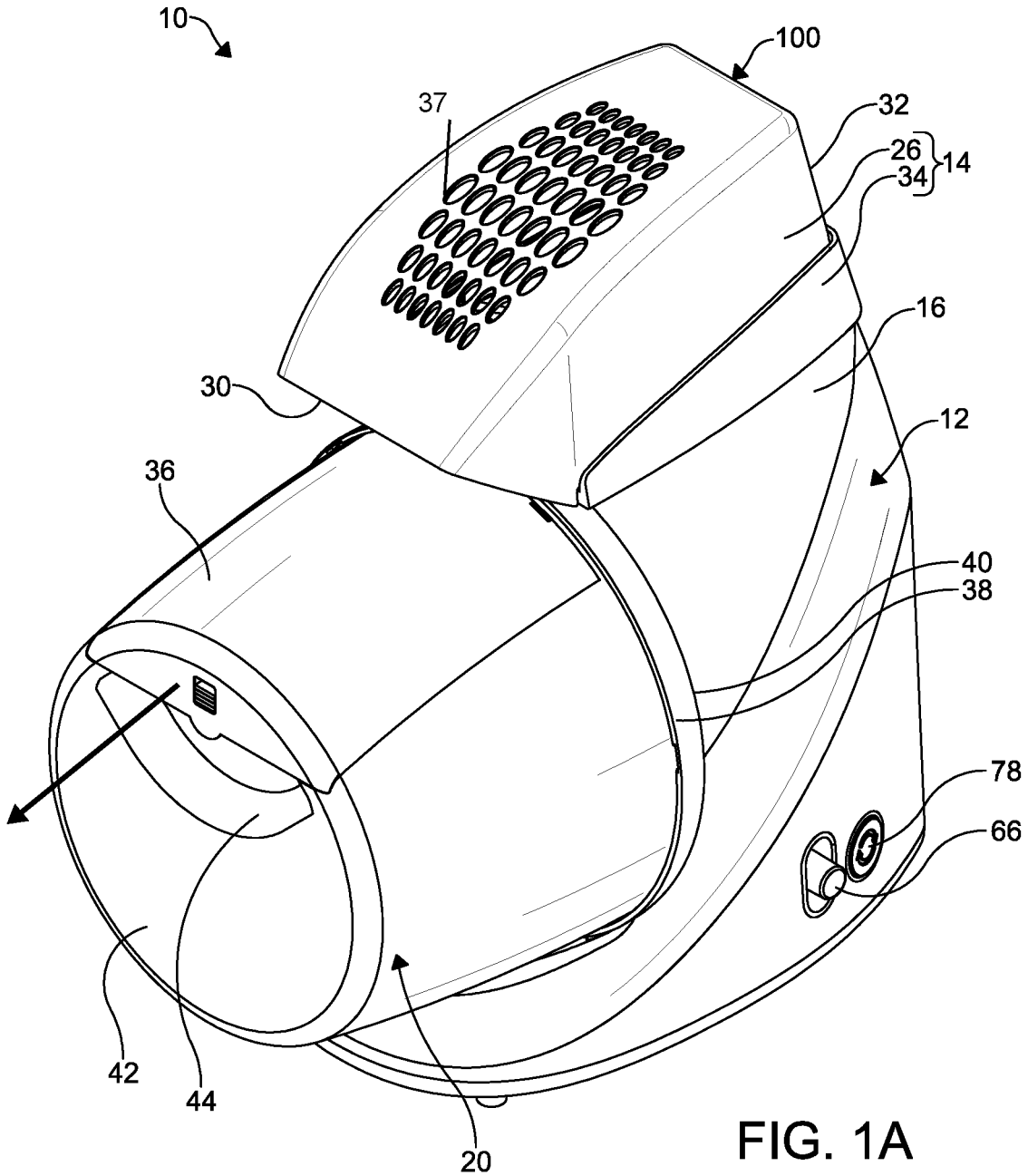
FIG. 1A is a top perspective view of a popping and mixing device according to an embodiment of the disclosure, wherein a popper top cover is shown in a first dispensing position.
Figure 1B:
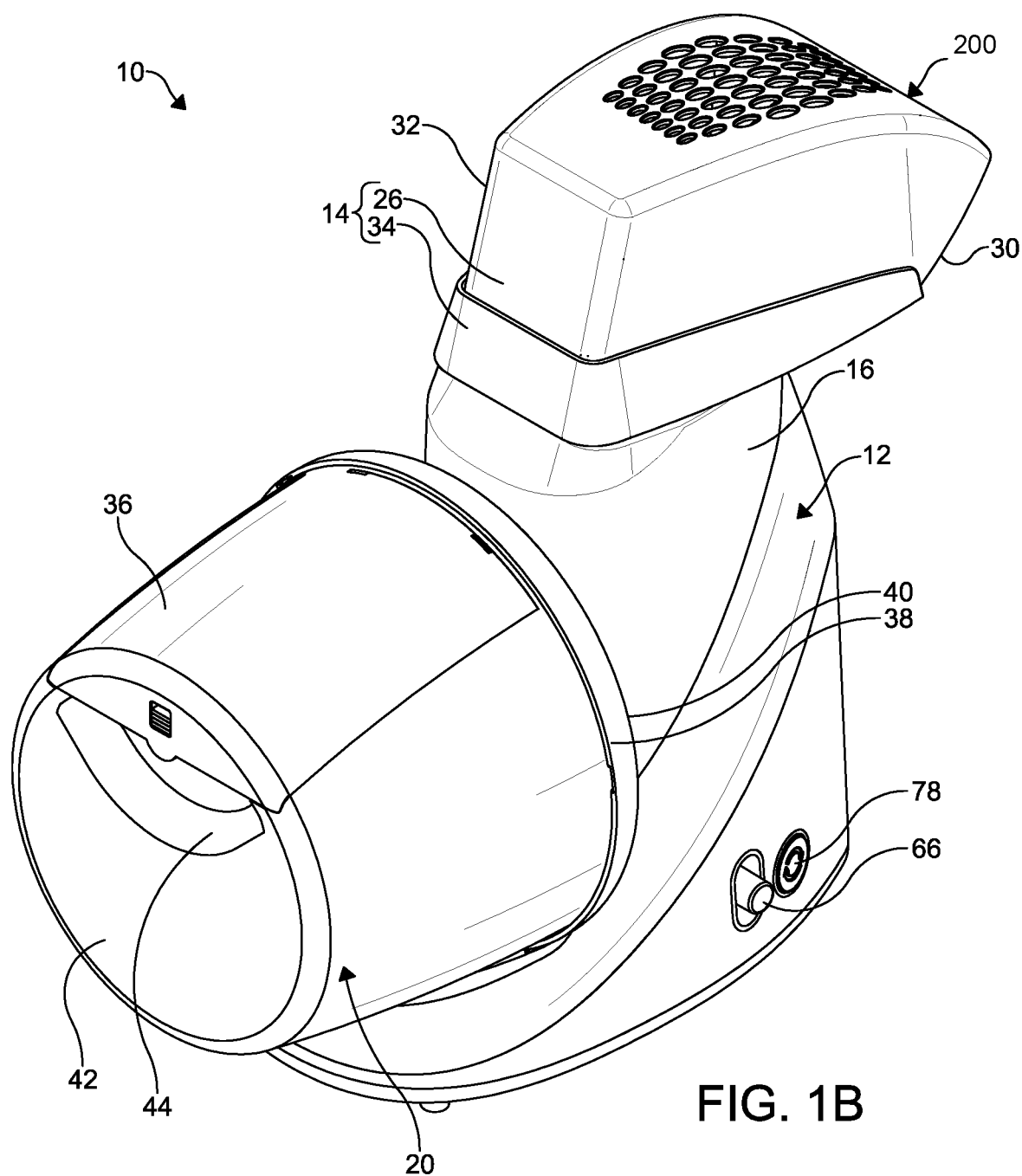
FIG. 1B is a top perspective view of the popping and mixing device of FIG. 1A, wherein the popper top cover is shown in a second dispensing position.
Figure 2:
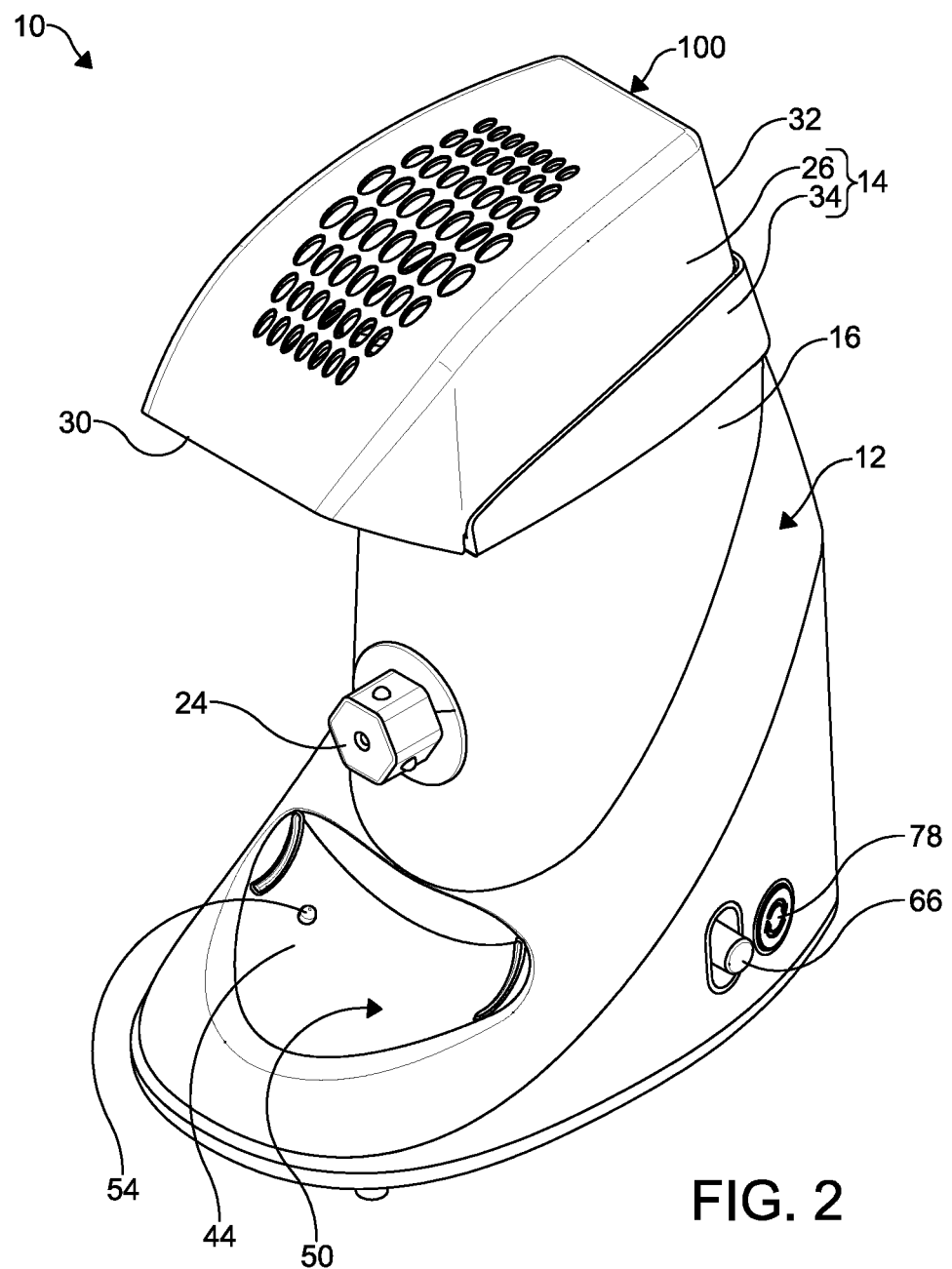
FIG. 2 is a top perspective view of the popping and mixing device of FIG. 1A with a mixing container removed therefrom.
Figure 3:
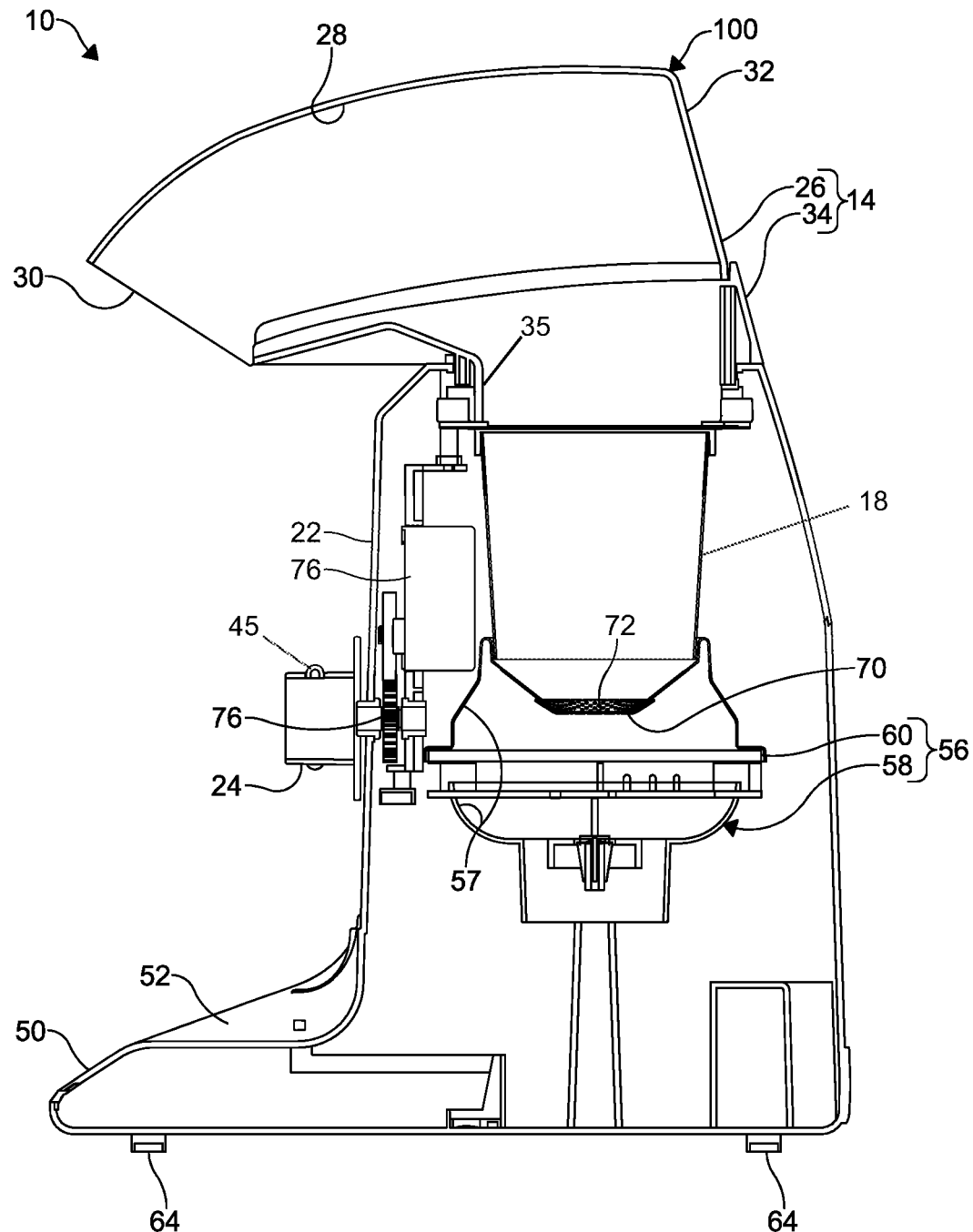
FIG. 3 is a cross-sectional view of the popping and mixing device of FIG. 2.

FIGS. 1-3 illustrate a popping and mixing device 10 for popping popcorn (i.e. corn) kernels and mixing the popped popcorn kernels with a flavoring. The popping and mixing device 10 includes a housing 12 that houses internal components of the popping and mixing device 10 as will be later described in further detail. A popper top cover 14 is coupled to a top end 16 of the housing 12. The popper top cover 14 is in communication with a popping chamber 18 disposed within the housing 12. The popping and mixing device 10 further includes a mixing container 20 rotatably coupled to a front side 22 of the housing 12 via a shaft 24. The mixing container 20 is supported on a base 50 of the housing 12. The base 50 includes a channel 52 for receiving a portion of the mixing container 20.

The popper top cover 14 includes an open end 30 and a closed end 32. The popper top cover 14 includes an enclosure 26 cooperating with a chute 34 to define a chamber 28 for receiving the popped kernels of popcorn. The popper top cover 14 is rotatable about an axis extending longitudinally through the top end 16 of the housing 12 and through a central axis of the popping chamber 18. The popper top cover 14 is rotatable between a first dispensing position 100 as shown in FIG. 1A and a second dispensing position 200 as shown in FIG. 1B. In the first dispensing position 100 the popper top cover 14 guides popped kernels to the mixing container 20. In the second dispensing position 200, the popper top cover 14 guides popped kernels away from the mixing container 20 to a secondary container or bowl (not shown), for example. In the second dispensing position 200, the popped kernel can be guided to the secondary container while, simultaneously, the previously popped kernels can be mixed in the mixing container 20. In this way, two batches of popcorn are being made or processed by the device 10. In the embodiment illustrated, the popper top cover 14 in the second dispensing position 200 is rotated to a position approximately 180 degrees from the popper top cover 14 in the first dispensing position 100. However, it is understood, the popper top cover 14 in the second dispensing position 200 can be rotated at any degree from the popper top cover 14 in the first dispensing position 100 as desired. The chute 34 is disposed at a bottom of the popper top cover 14 to facilitate guiding the popped kernels into the mixing container 20 or the secondary container. An opening 35 is formed through the chute 34 to provide fluid communication between the popping chamber 18 and the popper top cover 14. The enclosure 26 is removeably received in the chute 34, whereby a user can easily remove the enclosure 26 from the chute 34 to permit access to the popping chamber 18. Access to the popping chamber 18 permits a user to fill the popping chamber 18 with popcorn kernels or remove popped kernels therefrom, if needed. A plurality of apertures 37 are formed in the popper top cover 14. As illustrated the plurality of apertures 37 are preferably formed in a top of the popper top cover 14. However, it is understood the apertures 37 can be formed in other portions of the popper top cover 14. The apertures 37 are configured to release air and heat flowing through the popping and mixing device 10.

The mixing container 20 is substantially cylindrical in shape and includes a door 36 slidable between a closed position and an open position. The door 36 slides in the direction indicated by the arrow in a substantially lateral direction, as shown in FIG. 1A. However, it is understood the door 36 can be hingedly or otherwise removeably coupled to the mixing container 20 as desired. A lid 38 closes the mixing container 20 at a first end 40 of the mixing container 30. A grip 44 is formed at a second end 42 of the mixing container 20 adjacent the door 36 to facilitate a user in sliding the door 36 between the closed position and the open position. It is understood that the mixing container 20 may not include a grip 44, as desired.

Figure 4:
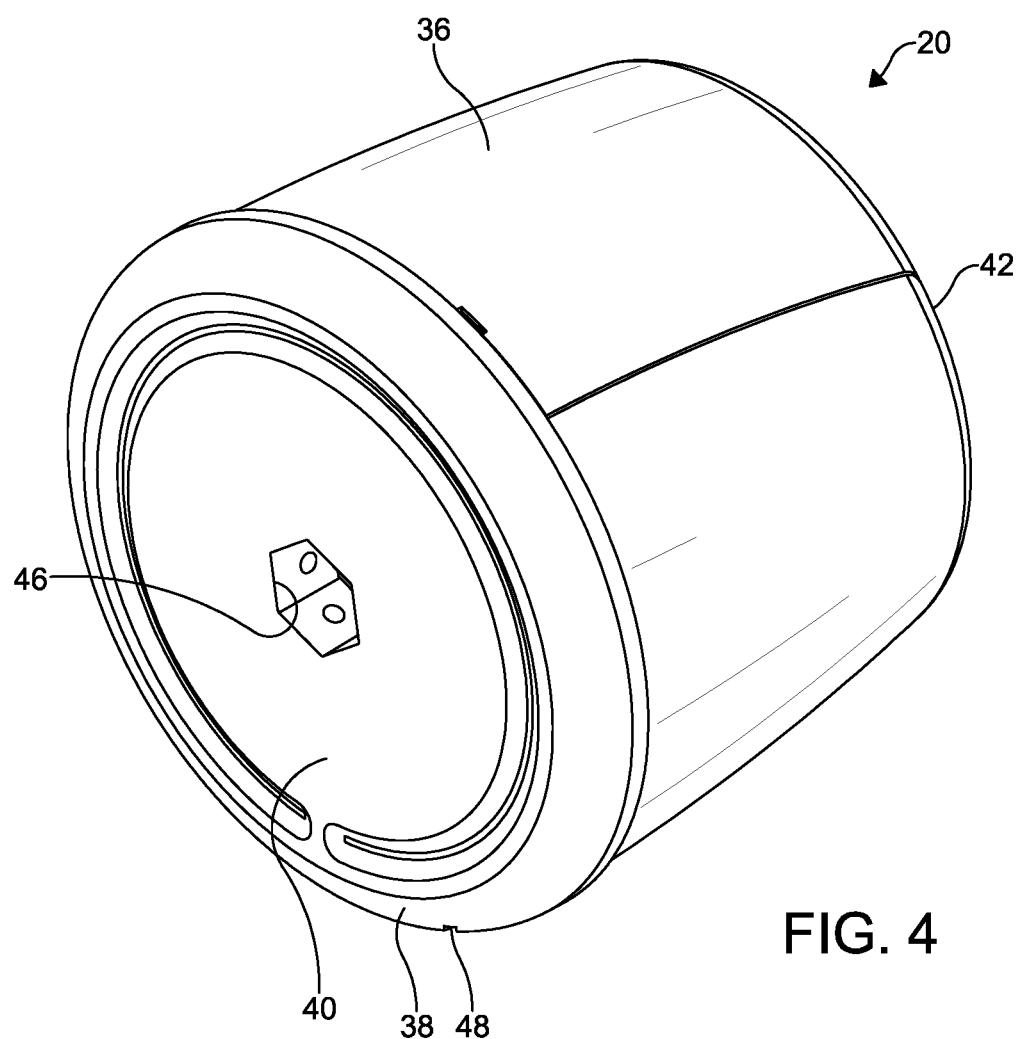
FIG. 4 is a rear perspective view of a mixing container of the popping and mixing device of FIG. 1A.

As shown in FIGS. 2-4, the lid 38 is removeably coupled to the first end 40 of the mixing container 20. A recess 46 is centrally formed in the lid 38 for engaging the shaft 24. The recess 46 has a substantially hexagonal shape to correspond to the shape of the shaft 24. However, it is understood the recess 46 can have any polygonal shape or curvilinear shape as desired to correspond to the shaft 24. The shaft 24 and recess 46 are further engaged by a detent system wherein the shaft 24 has catches 45 configured to engage indentations formed on an inner surface of the recess 46. It is understood, in another embodiment, the recess 46 can include the catches 45 and the shaft 24 can include the indentations.

A rib feature 48 is formed on a shoulder of the lid 38. The rib feature 48 diametrically opposes the door 36 of the mixing container 20. When the mixing container 20 is coupled to the housing 12, the rib feature 48 engages a switch 54 disposed in the channel 52 of the base 50. The rib feature 48 engages the switch 54 to alert a user the mixing container 20 is in a home position and the door 36 is facing in an upward position.

Referring now to FIG. 3, the internal components of the housing 12 are shown which include a heat assembly 56 with a chamber 57 defining a hollow interior. The heat assembly 56 includes a motor and fan assembly 58 disposed in a lower portion of the chamber 57 and a heater element 60 disposed in an upper portion of the chamber 57. Through the action of the motor and fan assembly 58, ambient air may be drawn into the chamber 57 through openings in the housing 12. For example, the openings may be formed on a bottom of the housing 12. The bottom of the housing 12 may be raised off a countertop or a surface by feet 64 to permit adequate flow of air to be drawn into the housing 12 and thus into the blower and fan assembly 58 and through the heater element 60. The motor and heater assembly 56 is powered by a power source. For example, the heat assembly 56 can be battery powered or powered from a DC power source or an AC power source and/or with a power cord (not shown). The heat assembly 56 may be de-energized with a switch 66 (see FIGS. 1A-2) disposed through the housing 12 and in communication with the power source.

The popping chamber 18 is disposed in the housing 12 intermediate the popper top cover 14 and the upper portion of the chamber 57. In the embodiment illustrated, a lower end 70 of the popping chamber 18, which is substantially frustoconically shaped, is received in a portion of the upper portion of the chamber 57. The popping chamber 18 receives the un-popped popcorn kernels, wherein the popcorn kernels are received on a cooking surface 72 or grate. The cooking surface 72 has holes formed therethrough for providing fluid communication between the chamber 57 and the popping chamber 18. The air from the motor and fan assembly 58 is passed through the heating element 60, where the air is heated, and guided to the cooking surface 72. The heated air then circulates and/or passes through the cooking surface 72, thereby heating the kernels and enabling the kernels to pop. As the popcorn kernels pop, the popped kernels begin to expand upward in the popping chamber 18 in a direction away from the heating surface 72. The heated air which is pressurized may flow through the popping chamber 18 and out through the open end 30 of the popper top cover 14 and/or through the apertures 37 formed in the popper top cover 14. The heated air may facilitate moving the popped popcorn kernels away from the cooking surface 72, thereby allowing other un-popped popcorn kernels to be positioned on the cooking surface 72 and popped thereafter.

The popped popcorn kernels are then guided through the popper top cover 14 by the chute 34 to the mixing container 20 through the door 36 when the popper top cover 14 is selectively positioned in first dispensing position 100. When the popper top cover 14 is selectively positioned in the second dispensing position 200, the popped popcorn kernels are guided through the popper top cover 14 by the chute 34 to the secondary container.

A mixing motor and gear assembly 74 drives the shaft 24. The mixing motor and gear assembly 74 may be de-energized with a switch 78 (see FIGS. 1A-2) disposed through the housing 12 and in communication with the power source. It is also understood the switch 54 in the base 50 can also be in communication with the power source. For example, when the mixing container 20 is in the correct position with the door 36 facing in the upward position, the mixing container 20, and more specifically the rib feature 48, engages the switch 54 to permit the mixing container 20 to rotate. If the switch 54 is not engaged, the mixing container 20 will not rotate.

A flavor or seasoning can be added to the mixing container 20 before or after the popped popcorn kernels are guided through the popper top cover 14 in the first dispensing position 100 to the mixing container 20. Once the mixing container 20 is filled with a desired number of popped popcorn kernels, the door 36 is closed and the switch 78 energizes the mixing motor and gear and assembly 74. The flavor or seasoning then coats the popped popcorn kernels as the mixing container 20 rotates. As the mixing container 20 is rotating, the popper top cover 14 can be rotated to the second dispensing position 200 so popcorn kernels can be continually popped and guided into the secondary container. Conveniently, the user can easily detach the mixing container 20 from the housing 12, wherein the mixing container 20 can be used as a bowl or used to store uneaten popped popcorn kernels.

Advantageously, the popping and mixing device 10 of the present invention conveniently pops popcorn kernels and mixes the popped popcorn kernels evenly with flavoring or seasoning. As such, the popping and mixing device 10 minimizes the amount of steps required to mix popcorn with flavoring. The rotatability of the mixing container 20 allows the flavoring or seasoning to be evenly distributed onto the popped popcorn kernels. The popper top cover 14 is rotatable to allow simultaneous mixing of popped popcorn kernels and popping of additional popcorn kernels.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A popping and mixing device comprising:
   a housing;
   a popping chamber for receiving popcorn kernels and converting the same into popped popcorn kernels, the popping chamber disposed in the housing;
   a mixing container receiving the popped popcorn kernels from the popping chamber, the mixing container directly coupled to the housing by a shaft, wherein the shaft and the mixing container are coaxial when the mixing chamber is coupled to the housing; and
   a mixing motor in mechanical communication with the mixing container configured for rotating the popcorn mixing container about the shaft.

2. The popping and mixing device of claim 1, wherein the mixing container is rotatable with respect to the housing.

3. The popping and mixing device of claim 1, wherein the housing includes a base having a channel for receiving a portion of the mixing container.

4. The popping and mixing device of claim 1, wherein the mixing container includes a lid removeably coupled to an end thereof and a door removeably coupled thereto to permit access to the mixing container.

5. The popping and mixing device of claim 4, wherein the mixing container includes a recess formed in the lid, the recess configured for engaging the shaft.

6. The popping and mixing device of claim 4, wherein the door is slideable between an open position and a closed position.

7. The popping and mixing device of claim 4, wherein the lid closes the mixing container at a first end of the mixing container, wherein the lid includes an aperture formed therethrough for receiving the shaft, and wherein the door is disposed intermediate the first end of the mixing container and a second end of the mixing container opposite the first end of the mixing container.

8. The popping and mixing device of claim 1, wherein the mixing container includes a rib feature formed thereon, the rib feature cooperating with a switch to indicate the mixing container is in an orientation with the door facing upwardly.

9. The popping and mixing device of claim 1, wherein the mixing container is substantially cylindrical.

10. The popping and mixing device of claim 1, further comprising a popper top cover selectively: guiding the popped popcorn kernels from the popping chamber to the mixing container in a first dispensing position and guiding the popped popcorn from the popping chamber to a position away from the mixing chamber in a second dispensing position.

11. The popping and mixing device of claim 10, wherein the popper top cover is rotatable with respect to the housing about an axis extending longitudinally through a top end of the housing between the first dispensing position and the second dispensing position.

12. The popping and mixing device of claim 10, wherein the popper top cover includes an enclosure and a chute cooperating with each other to define the popping chamber for conveying the popped popcorn kernels.

13. The popping and mixing device of claim 1, wherein a motor and heater assembly is in heat transfer communication with the popping chamber, and wherein a first switch is in signal communication with the motor and heater assembly and a second switch is in signal communication with the mixing motor.

14. A popping and mixing device comprising:
   a housing;
   a popping chamber for receiving popcorn kernels and converting the same into popped popcorn kernels, the popping chamber disposed in the housing;
   a popper top cover including an enclosure and a chute each rotatable with respect to the housing about a longitudinal axis extending through the popping chamber between a first dispensing position and a second dispensing position;
   a mixing container receiving the popped popcorn kernels from the popping chamber, the mixing container directly coupled to the housing by a shaft, wherein the shaft and the mixing chamber are coaxial when the mixing chamber is coupled to the housing; and
   a motor and heater assembly in heat transfer communication with the popping chamber.

15. The popping and mixing device of claim 14, further comprising a mixing container rotatably coupled to the housing and a mixing motor and gear assembly for rotating the mixing container.

16. The popping and mixing device of claim 15, wherein the chute extends towards the mixing container in the first dispensing position of the popper top cover and the chute extends away from the mixing container in the second dispensing position of the popper top cover, wherein the mixing container receives the popped popcorn kernels from the popper top cover in the first dispensing position, and wherein the popper top cover conveys the popped popcorn kernels to a position away from the mixing container in the second dispensing position.

17. The popping and mixing device of claim 15, wherein the mixing container is rotatably coupled to the housing by a shaft rotatable by the mixer motor and gear assembly.

18. The popping and mixing device of claim 15, wherein the mixing container includes a lid removeably coupled to a first end thereof.

19. The popping and mixing device of claim 15, wherein the mixing container includes a door removeably coupled thereto to permit access of the popped popcorn kernels to the mixing container.

20. A popping and mixing device comprising:
   a housing;
   a popping chamber for receiving popcorn kernels and converting the same into popped popcorn kernels, the popping chamber disposed within the housing;

a popper top cover including an enclosure and a chute each rotatable with respect to the housing between a first dispensing position and a second dispensing position;

a mixing container receiving the popped popcorn kernels from the popping chamber via the popper top cover in the first dispensing position, the mixing container rotatably coupled to the housing, wherein the mixing container includes a first end directly coupled to the housing, a second end opposing the first end, and a door positioned intermediate the first end and the second end, wherein the chute extends towards the door in the first dispensing position of the popper top cover and away from the mixing container in the second dispensing position, wherein the door moves from an open position and a closed position, wherein the door in the open position provides access for the popped popcorn kernels to transfer from the popper top cover to the mixing container in the first dispensing position of the popper top cover and the door in the closed position prevents transfer of the popped popcorn kernels from the popper top cover to the mixing container; and a mixing motor in mechanical communication with the mixing container by a shaft configured for rotating the popcorn mixing container, wherein the shaft is coaxial with the mixing container when the mixing chamber is coupled to the housing.

\* \* \* \* \*